(12) United States Patent
Cheiney et al.

(10) Patent No.: US 12,607,757 B2
(45) Date of Patent: Apr. 21, 2026

(54) FIBER OPTIC DOSIMETER FOR SPACE ENVIRONMENT AND DOSIMETRY PROCESS

(71) Applicants: EXAIL, Saint-Germain-en-Laye (FR); CENTRE NATIONAL D'ETUDES SPATIALES, Paris (FR); CENTRE NATIONAL DE LA RECHERCHE SCIENTIFIQUE, Paris (FR); UNIVERSITÉ JEAN MONNET SAINT ETIENNE, Saint Etienne (FR)

(72) Inventors: Pierrick Cheiney, Saint-Germain-en-Laye (FR); Thierry Robin, Saint-Germain-en-Laye (FR); Gilles Melin, Saint-Germain-en-Laye (FR); Nicolas Balcon, Toulouse (FR); Julien Mekki, Toulouse (FR); Sylvain Girard, Saint-Etienne (FR)

(73) Assignees: EXAIL, Saint-Germain-en-Laye (FR); CENTRE NATIONAL D'ETUDES SPATIALES, Paris (FR); CENTRE NATIONAL DE LA RECHERCHE SCIENTIFIQUE, Paris (FR); UNIVERSITÉ JEAN MONNET SAINT ETIENNE, Saint Etienne (FR)

( * ) Notice: Subject to any disclaimer, the term of this patent is extended or adjusted under 35 U.S.C. 154(b) by 263 days.

(21) Appl. No.: 18/512,596

(22) Filed: Nov. 17, 2023

(65) Prior Publication Data

US 2024/0168177 A1    May 23, 2024

(51) Int. Cl.
*G01T 1/02*        (2006.01)
*G01T 7/00*        (2006.01)

(52) U.S. Cl.
CPC .............. *G01T 1/026* (2013.01); *G01T 7/005* (2013.01)

(58) Field of Classification Search
None
See application file for complete search history.

(56) References Cited

FOREIGN PATENT DOCUMENTS

| | | | |
|---|---|---|---|
| CN | 111505695 | * | 8/2020 |
| CN | 111505695 B | | 12/2021 |
| EP | 2591387 B1 | | 2/2019 |
| WO | WO 01/82426 | * | 1/2001 |

(Continued)

OTHER PUBLICATIONS

French Search Report for FR2212028 dated Jun. 6, 2023, 2 pages.

*Primary Examiner* — Hoon K Song
(74) *Attorney, Agent, or Firm* — NIXON & VANDERHYE

(57) ABSTRACT

This relates to a dosimeter including a light source capable of generating a light beam, an optical coupler-splitter, a radio-sensitive optical fiber, a first photodetector arranged to record a power measurement of the light beam transmitted through the radio-sensitive optical fiber, a reference optical arm, a second photodetector arranged to record a reference power measurement of the light beam transmitted through the reference optical arm, and an electronic system configured to extract a differential radiation induced attenuation measurement in the radio-sensitive optical fiber with respect to the reference optical arm. The light beam is non-polarized or depolarized, or, respectively, the light beam is polarized and the radio-sensitive optical fiber is a polarization-maintaining fiber.

20 Claims, 2 Drawing Sheets

(56) References Cited

FOREIGN PATENT DOCUMENTS

| | | | |
|---|---|---|---|
| WO | 0182426 | A2 | 11/2001 |
| WO | 2008054339 | A2 | 5/2008 |
| WO | WO 2008/054339 | * | 8/2008 |

* cited by examiner

FIBER OPTIC DOSIMETER FOR SPACE ENVIRONMENT AND DOSIMETRY PROCESS

CROSS-REFERENCE TO RELATED APPLICATIONS

This application claims the priority under 35 USC 119(a) of French patent application 2212028 filed on Nov. 18, 2022, the entirety of which is incorporated herein by reference.

TECHNICAL FIELD

The present invention relates to the technical field of dosimetry equipment, devices and methods for measuring radiation doses, expressed in Gray (1 Gy=1 J/kg), in particular in a mixed environment comprising ions, protons, electrons, neutrons and/or photons.

More precisely, the present invention relates to a point dosimeter for providing a real-time high-accuracy radiation dose measurement. The invention also relates to a dosimeter for providing a total ionizing dose (TID) measurement over a wide dynamic range and/or a long duration.

In particular, such a dosimetry equipment, device and method finds applications in the space field, in any type of space radiative environment, or in the medical and scientific fields of high-energy physics, as a reference sensor for other dosimeters, or in the nuclear field.

PRIOR ART

It is important that a dosimetry can be made in any type of space radiative environment, i.e. on any type of platform and on all orbits. Indeed, manned flights, missions on the surface of the moon or planets, space probes, samples taken during space missions or also stratospheric balloon flights are exposed to different radiative environments, called space radiative environments. For example, it is important to be able to measure the radiation dose received by an astronaut in a space station at each moment and cumulatively over the duration of a mission. Time-resolved dosimetry can also be used to detect solar flares or to monitor the neutrons received during an extravehicular mission, on the moon or on a planet.

Different types of passive or active point dosimeters exist. Passive dosimeters are known, which are based on thermo-luminescent materials, optically stimulable or using defect concentration measurements by electron paramagnetic resonance. These passive dosimeters are read after irradiation but do not allow an accurate real-time dose measurement. Active dosimeters also exist, which are based for example of microelectronic components.

It is also known to use a fiber-optic dosimeter based on a radiation induced attenuation (RIA) measurement, also called radiation induced loss measurement, for different types of radiations: ions, protons, electrons, neutrons and/or photons. In particular, it is known to use a dosimeter comprising a radio-sensitive optical fiber, a light source and a photodetector to measure, as a function of time, the optical power losses of the light beam transmitted through the optical fiber to deduce therefrom, thanks to a pre-calibration, the radiation induced attenuation in the optical fiber. An optical fiber is made radio-sensitive by doping the core and/or the optical cladding, for example with phosphorus, which makes the optical fiber sensitive to ionizing radiations.

Some dosimeters based on the RIA measurement in an optical fiber provide high sensitivity at low radiation doses, for example with a sensitivity of the order of 1 dB·km$^{-1}$·Gy$^{-1}$ and an accuracy of 20%. However, the RIA generally depends on the temperature and the dose rate and significantly decreases after the end of exposure to radiation. Moreover, the intensity of the light source limits the measurement dynamics.

In many terrestrial applications, a dosimeter can comprise a part exposed to radiation and an other part protected from radiation. On the contrary, in space environment, the whole system is subjected to radiations. Space environment imposes drastic operating conditions: small footprint, low mass and low energy consumption, mechanical resistance to shocks and vibrations and insensitivity to strong thermal variations in the space environment. These conditions make fiber-optic dosimeters very difficult to use in space environment for accurate dose measurements.

One of the objects of the invention is to propose an active dosimeter of high accuracy over a wide dynamic range, particularly at very low radiation doses and dose rates. Another object of the invention is to propose a point dosimeter having an answer independent of the temperature and the dose rate, in particular for applications in space environment. Still another object of the invention is to propose a dosimeter sensitive to electron, proton, photon, neutron and/or ion radiations.

DISCLOSURE OF THE INVENTION

For that purpose, the invention relates to a dosimeter comprising a light source capable of generating a light beam, an optical coupler-splitter capable of receiving the light beam emitted by the light source and to transmit separately a first part of the light beam and a second part of the light beam, a radio-sensitive optical fiber, wherein the radio-sensitive optical fiber is arranged to receive the first part of the light beam, a first photodetector arranged to record a power measurement of the light beam transmitted through the radio-sensitive optical fiber, a reference optical arm of smaller optical length than that of the radio-sensitive optical fiber, the reference optical arm being arranged to receive the second part of the light beam, a second photodetector arranged to record a reference power measurement of the light beam transmitted through the reference optical arm, and an electronic system capable of receiving simultaneously the power measurement of the first photodetector and the reference power measurement of the second photodetector, the electronic system being configured to extract a differential radiation induced attenuation measurement in the radio-sensitive optical fiber with respect to the reference optical arm.

According to the invention, the light beam is non-polarized or depolarized, or, respectively, the light beam is polarized and the radio-sensitive optical fiber is a polarization-maintaining fiber.

According to a particular and advantageous aspect, the light source comprises an amplified spontaneous emission source generating the light beam by amplified stimulated emission, the light beam being non-polarized.

According to another particular and advantageous aspect, the dosimeter comprises an active or passive optical device arranged downstream of the light source and configured to depolarize the light beam.

In an exemplary embodiment, the passive optical device comprises a depolarizer, for example a Lyot depolarizer or a polarization combiner and two polarization-maintaining optical fibers of different lengths.

In another exemplary embodiment, the active optical device comprises an optical phase modulator, for example an electro-optical modulator.

Advantageously, the light source comprises a laser diode or a superluminescent diode.

Advantageously, the radio-sensitive optical fiber is a single-mode or multi-mode fiber. In an exemplary embodiment, the reference optical arm comprises an optical fiber section.

According to a particularly advantageous aspect, the electronic system comprises a logarithmic amplifier configured to receive simultaneously the power measurement of the first photodetector and the reference power measurement of the second photodetector, the logarithmic amplifier being capable of extracting the differential radiation induced attenuation measurement in the radio-sensitive optical fiber.

In an exemplary embodiment, the light source is capable of emitting the light beam at a first wavelength and at a second wavelength distinct from the first wavelength, the first photodetector being adapted to record a power measurement of the light beam transmitted through the radio-sensitive optical fiber at the first wavelength and at the second wavelength, the second photodetector being adapted to record the reference power measurement at the first wavelength and at the second wavelength, and the electronic system being capable of extracting the differential radiation induced attenuation measurement at the first wavelength and at the second wavelength.

According to a particular and advantageous aspect, the dosimeter comprises at least one temperature sensor arranged to acquire at least one temperature measurement at at least one point of the dosimeter, and the electronic system is adapted to correct the differential radiation induced attenuation measurement as a function of said at least one temperature measurement.

Advantageously, the dosimeter comprises a reflective element arranged at a distal end of the radio-sensitive optical fiber, the first photodetector being arranged to record the power measurement of the light beam transmitted after a round trip through the radio-sensitive optical fiber.

According to a particular aspect, the first photodetector and the second photodetector each comprise a photodiode.

According to another particular and advantageous aspect, the dosimeter comprises an other radio-sensitive optical fiber and a beam splitter arranged between the light source, the radio-sensitive optical fiber and the other radio-sensitive optical fiber, the beam splitter being capable of splitting the light beam between the radio-sensitive optical fiber and the other radio-sensitive optical fiber, an other photodetector arranged to record an other power measurement of the light beam transmitted through the other radio-sensitive optical fiber, the electronic system being adapted to receive the other power measurement of the other photodetector, the electronic system being configured to extract an other differential radiation induced attenuation measurement in the other radio-sensitive optical fiber with respect to the reference optical arm.

The invention also relates to a dosimetry method comprising the following steps: emitting a light beam; splitting the light beam into a first part of the light beam and a second part of the light beam; injecting the first part of the light beam into a radio-sensitive optical fiber, the light beam being depolarized or, respectively, the light beam being polarized and the radio-sensitive optical fiber being a polarization-maintaining fiber; injecting the second part of the light beam into a reference optical arm of smaller optical length than that of the radio-sensitive optical fiber; recording on a first photodetector a power measurement of the light beam transmitted through the radio-sensitive optical fiber; recording on a second photodetector a reference power measurement of the light beam transmitted through the reference optical arm; and electronically processing the power measurement of the first photodetector and the reference power measurement of the second photodetector to extract therefrom a differential radiation induced attenuation measurement in the radio-sensitive optical fiber with respect to the reference optical arm.

Obviously, the different features, alternatives and embodiments of the invention can be associated with each other according to various combinations, insofar as they are not incompatible or exclusive with respect to each other.

BRIEF DESCRIPTION OF THE DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same references numbers.

DETAILED DESCRIPTION

The present disclosure proposes a point dosimeter based on a measurement of radiation induced attenuation in the radio-sensitive optical fiber. The dosimeter is configured to have a high sensitivity at low radiation doses, a great accuracy and a great measurement dynamics. Advantageously, the dosimeter is stable with respect to ambient temperature variations.

Here, the term "point dosimeter" means a dosimeter capable of taking measurements of induced attenuation that are integrated over the whole length of the optical fiber. Such a point dosimeter is different from a fiber-optic reflectometer, which is used to locally measure an attenuation in the fiber and to determine the position of this attenuation as a function of the longitudinal direction of the fiber.

Figure 1:
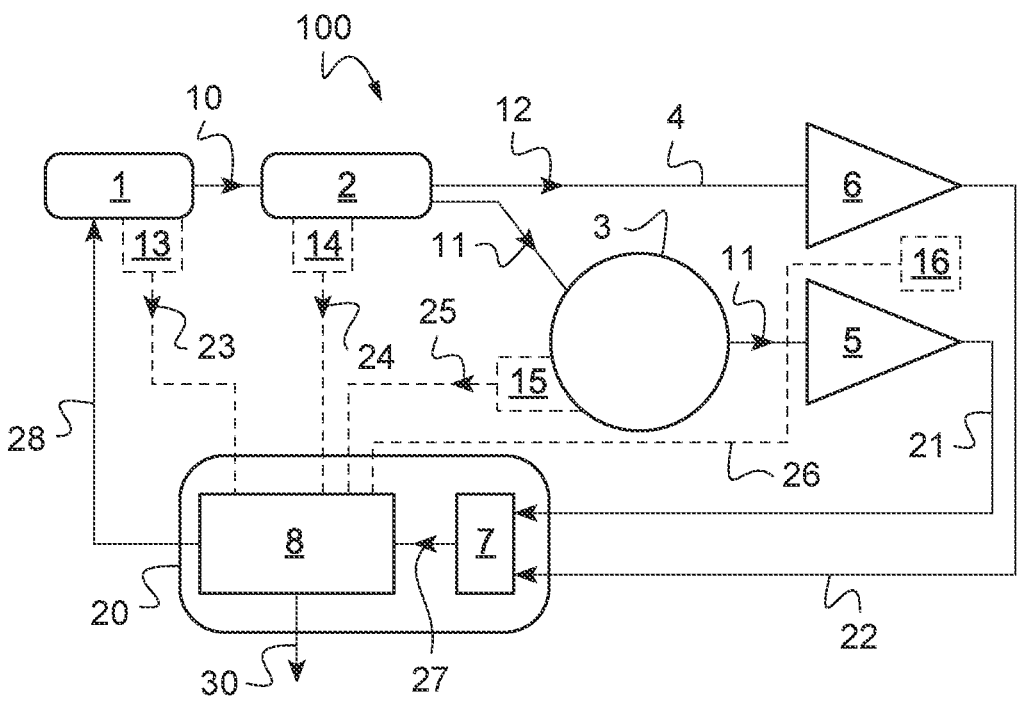
FIG. 1 schematically shows a dosimeter according to an exemplary embodiment.

FIG. 1 illustrates the structure of a dosimeter 100. The dosimeter 100 comprises a light source 1, an optical coupler-splitter 2, a radio-sensitive optical fiber 3, a reference arm 4, a first photodetector 5, a second photodetector 6 and an electronic system 20. The measurement principle is based on a differential measurement of the RIA optical losses between two measurement arms of different optical lengths comprising, on the one hand, the radio-sensitive optical fiber 3 and, on the other hand, the reference arm 4.

The radio-sensitive optical fiber 3 is a fiber whose optical transmission properties vary with the radiation dose received. For example, the radio-sensitive optical fiber 3 is an optical fiber with a phosphorus or aluminum-doped core. For example, the radio-sensitive optical fiber 3 is a phosphosilicate or aluminosilicate fiber. Such a fiber is sensitive to ionizing radiations in a neutron, X-ray or gamma-ray energy range. The radio-sensitive optical fiber 3 has a great length, between 50 m and 10 km, for example 100 m, 2 km, 5 km or 7 km. The optical fiber length is optimized by taking into account the sensitivity coefficient of this optical fiber at the source wavelength(s) used, expressed for example in dB·km$^{-1}$·Gy$^{-1}$. In the example illustrated in FIG. 1, the radio-sensitive optical fiber 3 selected is a phosphosilicate fiber of 5 km long. The radio-sensitive optical fiber 3 is wound in coil form to have a reduced footprint. The diameter of the coil of radio-sensitive optical fiber 3 is generally between 20 mm and 200 mm, for example of the order of 40 mm.

As described in more detail hereinafter in the present disclosure, the radio-sensitive optical fiber can be, according to the embodiments, a single-mode (SM) fiber, a multi-mode (MM) fiber or also a polarization-maintaining (PM) fiber.

Figure 2:
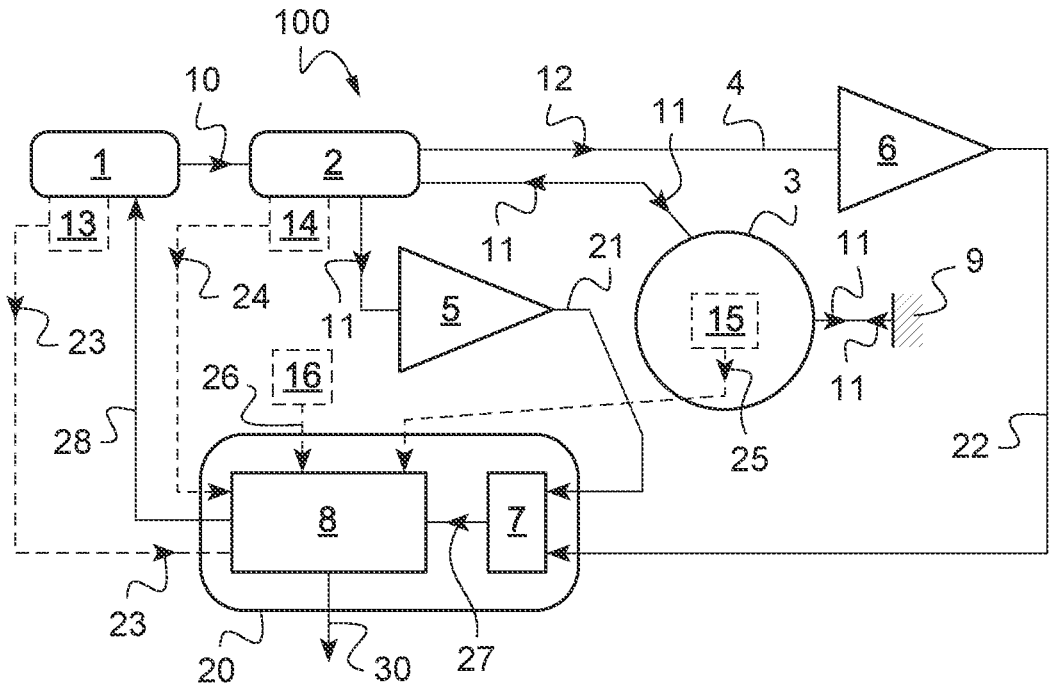
FIG. 2 schematically shows a dosimeter according to another exemplary embodiment, FIG. 3 schematically shows an example of non-polarized source.

In an alternative embodiment illustrated in FIG. 2, a reflector 9 is arranged at the distal end of the radio-sensitive optical fiber 3. The reflector 9 comprises for example a mirror arranged opposite the distal end of the radio-sensitive optical fiber 3. The reflector 9 can also be consisted of a reflective treatment applied to the distal end of the radio-sensitive optical fiber 3. The reflector 9 can also be consisted of a fiber Bragg reflector.

The reference arm 4 is an arm that has a far shorter optical path than the radio-sensitive optical fiber 3. The reference arm 4 comprises for example an optical fiber section of short length. In an example, the optical fiber section of the reference arm 4 has the same structure and/or composition as the radio-sensitive optical fiber 3 and of very shorter length than that of the radio-sensitive optical fiber 3. However, the optical fiber in the reference arm is not necessarily a radio-sensitive fiber. For example, the reference arm 4 comprises an optical fiber section having a length of 1 m.

The first photodetector 5 and the second photodetector 6 comprise for example photodiodes.

The electronic system 20 makes it possible to monitor and control the active elements, such as the light source 1 and the photodetectors 5, 6. The electronic system 20 also allows processing the power measurements transmitted in the radio-sensitive optical fiber and in the reference arm, calculating the radiation induced losses and the corresponding radiation dose. The electronic system 20 also allows the transfer to the user of data 30 comprising in particular the dose measurement result D extracted from the differential RIA measurement 27. The dosimeter performs real-time measurements, with for example acquisition of a measurement point on the two photodetectors 5, 6, every microsecond (in other words, at a MHz acquisition rate), according to the performances of the detection electronics. This system makes it possible to detect very short radiative events. This system also makes it possible to take and read real-time differential RIA measurements.

Optionally, the dosimeter 100 comprises one or several temperature sensor(s). For example, FIG. 1 illustrates a temperature sensor 13 arranged near the light source 1, an other temperature sensor 14 arranged near the optical coupler-splitter 2 and/or an other temperature sensor 15 arranged near the coil of radio-sensitive optical fiber 3 and/or an other temperature sensor 16 arranged near the first photodetector 5 and/or the second photodetector 6. Particularly advantageously, the photodiodes 5, 6 are placed close to each other in such a way that they have the same temperature and that their thermal dependence partially compensates for each other. In practice, the most useful sensor is the temperature sensor 16 located near the photodetectors 5, 6. The signals 23, 24, 25, 26 coming respectively from the temperature sensors 13, 14, 15, 16 are transmitted to the electronic system 20. A calculator 8 uses a model of conversion of optical losses into dose that uses these point temperature measurements to correct some drifts dues to the thermal effects on the components of the dosimeter, in particular on the photodiodes 5, 6 and/or, respectively, on the radio-sensitive optical fiber 3.

The operation of the dosimeter 100 will now be explained. The light source 1 emits a light beam 10. The light beam 10 is in the visible or infrared domain. The optical coupler-splitter 2 receives the light beam 10 and splits in into a first part of the light beam 11 and a second part of the light beam 12. The first part of the light beam 11 is injected at a proximal end of the radio-sensitive optical fiber 3. Simultaneously, the second part of the light beam 12 is injected into the reference arm 4. The optical coupler-splitter 2 is for example a coupler 90:10, in order to inject 90% of the optical power in the radio-sensitive optical fiber 3 and 10% of the optical power remaining in the reference arm 4. Advantageously, a coupler 50/50 is used, which has an optical coupling ratio that is stable by symmetry. Other optical coupling ratios are conceivable without departing from the framework of the present disclosure.

The first photodetector 5 receives the first part of the light beam 11 exiting from the radio-sensitive optical fiber 3 and the second photodetector 6 receives the second part of the light beam 12 exiting from the reference arm 4. The first detector 5 thus measures the power 21 of the first part of the light beam 11 after transmission through the radio-sensitive optical fiber 3. The second detector 6 thus measures the power 22 of the second part of the light beam 12 after transmission through the reference arm 4.

In the alternative embodiment illustrated in FIG. 2, the reflector 9 reflects the first part of the light beam 11 transmitted a first time through the radio-sensitive optical fiber 3 so that it propagates a second time, in the reverse direction, through the radio-sensitive optical fiber 3. The first detector 5 thus measures the power 21 of the first part of the light beam 11 after a round-trip through the radio-sensitive optical fiber 3. This alternative embodiment makes it possible to multiply by two the length of the optical path through the radio-sensitive optical fiber 3 without increasing its physical length.

The radiation dose received by the radio-sensitive optical fiber 3 is denoted D. Generally, for example in the case of a dosimeter illustrated in FIG. 1, the dose measurement is deduced from the absorption A due to the radiations in the optical fiber via a mathematical model, based for example on the following formula:

$$D = -\frac{10}{\eta L}\log_{10}A \qquad \text{[Math 1]}$$

where $\eta$ is the sensitivity of the fiber to radiations, (for example $\eta$=4 dB/km/Gy (SiO$_2$) at 1550 nm for a phosphosilicate fiber) and L is the length of the radio-sensitive optical fiber 3. This general formula must be adapted, for example, in the case of a dosimeter using a mirror as illustrated in FIG. 2, where the optical path length is equal to twice the optical fiber length. A precalibration makes it possible to adjust the model over the whole measurement dynamics. It is advantageous to use a long fiber length L, for a given accuracy on the reading of absorption A. However, the longer the length L of the radio-sensitive optical fiber 3, the higher the absorption A due to the radiations in the sensitive fiber. Now, at the wavelength of 650 nm, with a length L of 2 km, the initial absorption (before radiations) of the fiber is already of the order of 20 dB. In order to obtain an accurate optical attenuation measurement, it is advantageous to use a single light source 1 followed with the passive coupler-splitter 2 that splits the optical power between the second part of the light beam 12 towards the reference arm and the first part of the light beam 11 on the arm that passes in the radio-sensitive optical fiber 3, the attenuation A of which has to be measured. This architecture makes is possible to avoid power fluctuations of the optical source. However, the optical power difference measured by the two photo-detectors 5 and 6 can be very large, in particular when the length L of the radio-sensitive optical fiber 3 is long, generally several km long, for example 5 km.

The electronic system 20 is designed to make a ratio between the power 21 of the first part of the light beam 11 and the power 22 of the second part of the light beam 12 in order to obtain a differential radiation induced attenuation measurement 27. The calculator 8 then uses the differential RIA measurement 27 to deduce therefrom the radiation dose D received, on the basis of a model, for example as described hereinabove. Normalizing at each moment the power 21 transmitted via the radio-sensitive optical fiber 3 with respect to the power 22 transmitted via the reference arm 4 makes it possible to avoid power variations of the light source 1 as a function of time.

According to a particular and advantageous aspect, the electronic system 20 comprises a logarithmic amplifier 7. The logarithmic amplifier 7 is for example an analog integrated DC logarithmic amplifier. The logarithmic amplifier 7 receives simultaneously on two distinct input paths the power 21 of the first part of the light beam 11 and the power 22 of the second part of the light beam 12. For example, with two photodiodes 5, 6, the logarithmic amplifier 7 receives on an input path the photocurrent emitted by the signal photodiode 5 and on another input path the photocurrent emitted by the reference photodiode 6. The logarithmic amplifier 7 thus makes it possible to compare these photocurrents. More precisely, the logarithmic amplifier 7 performs directly an analog logarithmic ratio operation that makes it possible to provide directly the differential RIA measurement 27 in decibels. Indeed, the logarithmic amplifier 7 uses the exponential relation between the voltage and the current in a junction PN to have an intrinsically logarithmic relation between an input current and an output voltage, which makes it possible to obtain an accurate attenuation measurement even when the photocurrent varies by several orders of magnitude. On the contrary, an electronic system based on the use of two independent transimpedance amplifiers generates a strong difference between the two photocurrents, and requires a very unbalanced adjustment of the transimpedance amplifiers to compensate for this strong difference.

Contrary to the electronic systems in which each analog signal is first digitized via an analog-digital converter before applying a digital division calculation, the operations are made directly and mainly on analog signals. That way, the measurement accuracy is not limited by the resolution nor by the dynamics of an analog-digital converter. Moreover, the flow of data at the output of the logarithmic amplifier 7 is not limited by the memory block size. The use of such a logarithmic amplifier 7 makes it possible to strongly increase the accuracy and dynamics of measurement of the RIA signal by several orders of magnitude, in particular near the low radiation doses.

However, according to an aspect of the present disclosure, power measurement instabilities linked to polarization effects limit the detection of low radiation doses. Generally, the light polarization is not kept during the propagation in a single-mode (SM) fiber that is not of the polarization-maintaining type. The polarization of a light beam changes in particular very strongly as a function of the fiber mechanical stress or the temperature. If a polarized light beam is injected into a single-mode fiber, the polarization of the light beam at the output of the fiber is difficult to control and changes rapidly in particular due to temperature fluctuations. Moreover, some optical components indispensable for the attenuation measurement, such as the coupler-splitter 2 and the photodiodes 6, 7 have a response that slightly depends on the polarization. It is estimated that the difference of "polarization dependent losses" (PDL) between the two orthogonal polarizations is of the order of at least 0.1 dB. Unexpectedly, and although this difference is apparently small, this phenomenon is liable to limit the accuracy of a measurement of radiation induced attenuation in a single-mode (SM) fiber. Indeed, the polarization fluctuations are converted into power fluctuations. It follows from the present disclosure that the polarization effects directly and strongly affect the detection limit and the accuracy of a fiber-optic dosimeter exploiting the phenomenon of radiation induced attenuation (RIA) to follow the time evolution of the dose deposited.

Different solutions are here proposed to reduce or cancel the polarization effects in a fiber-optic dosimeter.

Figure 3:
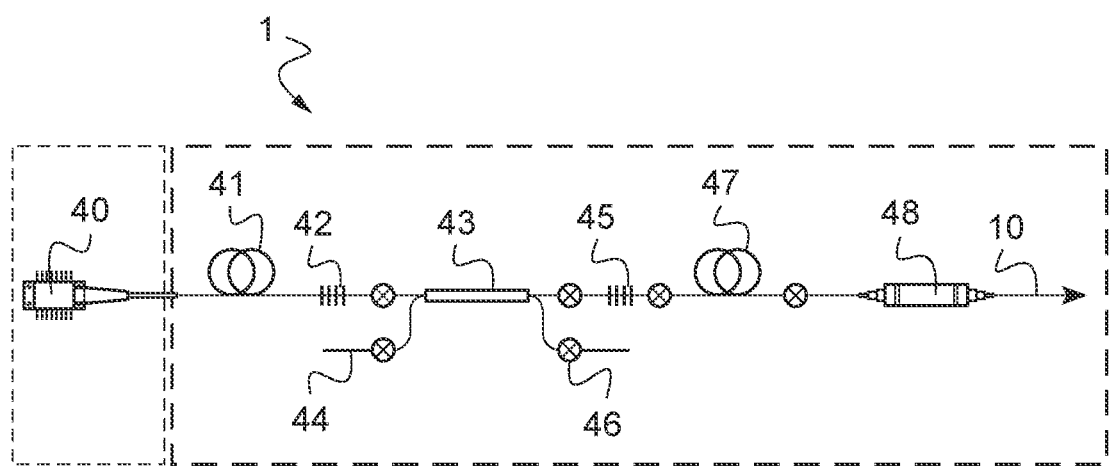

According to a first embodiment, the light source 1 is a non-polarized optical source. Different non-polarized sources are contemplated. By way of non-limiting example, an Amplified Stimulated Emission (ASE) source illustrated in FIG. 3. The source 1 of FIG. 3 includes a pump diode 40 connected via an optical fiber 41 to a coupler-multiplexer 43. The pump diode 40 emits a pump signal at a pump wavelength, for example of 980 nm. A first Bragg grating 42 is arranged upstream of the coupler-multiplexer 43 and configured to favor the emission of the laser diode at a precise wavelength, here of 980 nm. The coupler-multiplexer 43 receives on an input path the pump signal filtered at 980 nm. The coupler-multiplexer 43 receives on another input path 44 a signal to be amplified at a determined wavelength as a function of the amplifier medium. In the case of an erbium ASE source, the wavelength of the signal to be amplified is 1550 nm. A second Bragg grating 45 is arranged downstream of the coupler-multiplexer 43 and configured to favor the stable emission at 1550 nm by the optical amplifier medium 47, here consisted of an erbium-doped optical fiber. At the output of the coupler-multiplexer 43, the pump signal at 980 nm and the signal to be amplified is 1550 nm are injected into the erbium-doped amplifying fiber. An optical isolator 48 is arranged at the output of the amplifying fiber to transmit the light beam 10 at 1550 nm emitted by the source 1. The source 1 thus performs the optical conversion of the polarized pump beam emitted by the pump laser diode, for example at 980 nm or 1480 nm, into a light beam at a wavelength in the telecom band (1532-1550 nm). Under the laser threshold, the photons emitted at a telecom wavelength are emitted spontaneously in such a way that the light beam emitted in the telecom band is non-polarized. This light source is then non-polarized. In other words, the light beam 10 generated by amplified stimulated emission is non-polarized. In this case, the optical coupler-splitter 2 is neither of the polarization-maintaining type, nor polarizing. The first part of the light beam 11 and the second part of the light beam 12 are non-polarized. The dosimeter 100 based on such a non-polarized source can use standard optical components and in particular a single-mode (SM) or multi-mode (MM) radio-sensitive optical fiber 3, which is not of the polarization-maintaining type. Likewise, the reference arm 4 is then based on components that are not on the polarization-maintaining type, for example a section of standard (SM) optical fiber or a section of multi-mode (MM) optical fiber. Polarimeters exist, for example based on rotating polarizers, that allow measuring the polarization state of a light beam. For a non-polarized light beam, for example, an identical power is measured in the two transverse polarization modes but no phase coherence between them. The use of an erbium ASE source makes it possible to cancel the polarization fluctuations on the RIA measurements.

According to an alternative of the first embodiment, a polarization source 1 is used, combined with a passive or active optical device, to average the polarization of the source light beam 10. By way of non-limiting example, a source is used, which comprises a superluminescent diode (SLED) that emits a polarized light beam. An active or passive optical component is placed downstream of the polarized source to depolarize the light beam emitted by the source.

In an example, the passive optical device is of the Lyot depolarizer type. The Lyot depolarizer principle is to make the two transverse polarization components follow different optical paths, whose optical path length is greater than the coherence length of the source, then to recombine the two polarizations. The Lyot depolarizer can be made by butt-welding two sections of polarization-maintaining optical fibers with proper axes misaligned by 45 degrees with respect to each other. In this case, the two optical paths correspond to the two indices of the PM fiber. As an alternative, if the coherence length of the source is great, a polarization combiner is used to inject the two transverse polarization components into different PM fibers and to recombine them at the output. Such a passive depolarizer is particularly suitable for a light source having a relatively small coherence length, as for example a superluminescent diode (SLED).

In another example, the active optical device is of the polarization scrambler type. This active optical device is configured to randomly modulate the phase in order to break the coherence of the source and the polarization thereof. The active optical device comprises an optical phase modulator, for example an electro-optical modulator. As an alternative, the active optical device is formed by applying a suitable mechanical stress on the fiber itself to randomly modulate the phase.

According to a second embodiment, the source 1 is polarized, the radio-sensitive optical fiber 3 is a polarization-maintaining (PM) fiber and all the optical chain between the source 1 and the photodetectors 5, 6 is of the polarization-maintaining type. Advantageously, this radio-sensitive optical fiber 3 is manufactured by doping the core or the optical cladding of a conventional PM fiber, for example with a phosphorus doping. In this case, the optical coupler-splitter 2 is of the polarization-maintaining type. The first part of the light beam 11 and the second part of the light beam 12 are polarized. The source-side and coil-side welds are made in such a way as to align the proper axes of the polarization-maintaining radio-sensitive optical fiber 3 with respect to the proper axes of the polarized source. Likewise, the proper axes of the reference arm 4 are aligned on the proper axes of the polarized source. The first part of the light beam 11 and the second part of the light beam 12 are thus polarized. The polarization of the light beam being then kept during the propagation in the radio-sensitive optical fiber 3 and in the reference arm 4, the PDL has no influence on the radiation induced attenuation measurement.

As an alternative, the dosimeter comprises at least two sources emitting at two distinct wavelengths, each source being connected to a suitable optical fiber. For example, the two sources are polarized and the two coils of radio-sensitive optical fiber are polarization-maintaining optical fibers. In another example, the two sources are non-polarized or depolarized. In still another example, the dosimeter comprises a first polarized source associated with a polarization-maintaining radio-sensitive optical fiber and a second non-polarized or depolarized source. The combination of two sources with two different wavelengths allows measurement redundancy and hence accuracy improvement. As an alternative, a single and same source is adapted to emit the light beam at several wavelengths, for example 16 distinct wavelengths.

According to another particular and advantageous aspect, a single light source 1 is used, coupled simultaneously with several coils of radio-sensitive optical fibers, for example with two or three optical fiber coils of different lengths and/or having a different sensitivity to ionizing radiations, in addition to the reference arm 4. Indeed, for example, an other radio-sensitive optical fiber and a beam splitter arranged between the light source 1, the radio-sensitive optical fiber 3 and the other radio-sensitive optical fiber are used. The beam splitter receives the light beam 10 of the light source and splits it between the radio-sensitive optical fiber 3 and the other radio-sensitive optical fiber. In this case, the splitter is located upstream from the coupler 2. It may be a power splitter of the 1×N coupler type or a multiplexer that makes it possible to address sequentially the different coils. Each coil needs its proper reference arm. Similarly to the first detector associated with the radio-sensitive optical fiber, an other photodetector is associated with the other radio-sensitive optical fiber and arranged to record an other power measurement of the light beam transmitted through the other radio-sensitive optical fiber. The electronic system 20 is here adapted to receive the other power measurement of the other photodetector, simultaneously with the measurement of the reference arm. The electronic system 20 is configured to extract an other differential radiation induced attenuation measurement in the other radio-sensitive optical fiber with respect to the reference optical arm. Such a configuration advantageously allows reading several dosimeters with a single optical source in such a way as to reduce the costs.

The drastic reduction of the polarization effects in the fiber-optic dosimeter makes it possible to make the dosimeter less sensitive to the ambient thermal variations. The reduction of the polarization fluctuations in the fiber-optic dosimeter also allows lowering the low radiation dose detection threshold, improving the accuracy of the RIA measurements and also increasing the dose measurement dynamics.

In total, the combination of an electronic system based on a logarithmic amplifier and the reduction of the polarization effects make it possible to lower the low radiation dose detection threshold to a few tens of microGy, to improve the RIA measurement accuracy and also to increase the dose measurement dynamics so that it extends between 1 Gy and 100 Gy, for example. In an exemplary embodiment, the dosimeter of the present disclosure makes it possible to reduce the detection noise by 1 to 2 orders of magnitude. The measured dose rate is included in a range between 100 gray/j and 1 Mgray/j. The dosimeter of the present disclosure thus allows measurements of radiation doses with a remarkable accuracy of the order of $10^4$ in relative on a dynamic range extending over 10 dB.

This architecture makes is possible to avoid power fluctuations of the light source 1. The differential RIA measurement makes it possible to chose a light source 1 whose intensity in not necessarily stabilized as a function of time. An ASE source or a laser diode is for example chosen.

The dosimeter can be conditioned in a very compact casing, for example a light-weight cylinder approximately 40 mm in diameter and 20 mm high. The dosimeter can thus be taken on-board a space station or even in the belt of an astronaut for an extravehicular exit. The dosimeter provides instantaneous measurements. The casing can be configured to transmit the dose measurements for example by a wireless connection to a display screen. These measurements allow for example anticipating a solar flare liable to damage sensitive equipment.

This point dosimeter can also find applications in the medical field for point measurement of radiation doses from medical equipment, for example in pulsed radiotherapy. This point dosimeter also finds applications in the nuclear field, for inspection and dismantling of any nuclear fusion and fission facilities.

Of course, various other modifications can be made to the invention within the scope of the appended claims.

The invention claimed is:

1. A dosimeter comprising:
a light source capable of generating a light beam,
an optical coupler-splitter capable of receiving the light beam emitted by the light source and to transmit separately a first part of the light beam and a second part of the light beam,
a radio-sensitive optical fiber, the radio-sensitive optical fiber being arranged to receive the first part of the light beam,
a first photodetector arranged to record a power measurement of the light beam transmitted through the radio-sensitive optical fiber,
a reference optical arm of smaller optical length than that of the radio-sensitive optical fiber, the reference optical arm being arranged to receive the second part of the light beam,
a second photodetector arranged to record a reference power measurement of the light beam transmitted through the reference optical arm, and
an electronic system capable of receiving simultaneously the power measurement of the first photodetector and the reference power measurement of the second photodetector, the electronic system being configured to extract a differential radiation induced attenuation measurement in the radio-sensitive optical fiber with respect to the reference optical arm, wherein,
the radio-sensitive optical fiber has a phosphorus or aluminium-doped core, and
the light beam is non-polarized or depolarized and the radio-sensitive optical fiber is a single-mode or multi-mode optical fiber which is not of the polarization-maintaining type, or,
the light beam is polarized and the radio-sensitive optical fiber is a polarization-maintaining fiber.

2. The dosimeter according to claim 1, wherein the light source comprises an amplified spontaneous emission source generating the light beam by amplified stimulated emission, the light beam being non-polarized.

3. The dosimeter according to claim 1, comprising an active or passive optical device arranged downstream of the light source and configured to depolarize the light beam.

4. The dosimeter according to claim 3, wherein the passive optical device comprises a depolarizer.

5. The dosimeter according to claim 3, wherein the active optical device comprises an optical phase modulator.

6. The dosimeter according to claim 3, wherein the light source comprises a laser diode or a superluminescent diode.

7. The dosimeter according to claim 1, wherein the radio-sensitive optical fiber is a single-mode or multi-mode fiber.

8. The dosimeter according to claim 1, wherein the reference optical arm comprises an optical fiber section.

9. The dosimeter according to claim 1, wherein the electronic system comprises a logarithmic amplifier configured to receive simultaneously the power measurement of the first photodetector and the reference power measurement of the second photodetector, the logarithmic amplifier being capable of extracting the differential radiation induced attenuation measurement in the radio-sensitive optical fiber.

10. The dosimeter according to claim 1, wherein the light source is capable of emitting the light beam at a first wavelength and at a second wavelength distinct from the first wavelength, the first photodetector being adapted to record a power measurement of the light beam transmitted through the radio-sensitive optical fiber at the first wavelength and at the second wavelength, the second photodetector being adapted to record the reference power measurement at the first wavelength and at the second wavelength, and wherein the electronic system is capable of extracting the differential radiation induced attenuation measurement at the first wavelength and at the second wavelength.

11. The dosimeter according to claim 1, comprising at least one temperature sensor arranged to acquire at least one temperature measurement at at least one point of the dosimeter, and wherein the electronic system is adapted to correct the differential radiation induced attenuation measurement as a function of said at least one temperature measurement.

12. The dosimeter according to claim 1, comprising an other radio-sensitive optical fiber and a beam splitter arranged between the light source, the radio-sensitive optical fiber and the other radio-sensitive optical fiber, the beam splitter being capable of splitting the light beam between the radio-sensitive optical fiber and the other radio-sensitive optical fiber, an other photodetector arranged to record an other power measurement of the light beam transmitted through the other radio-sensitive optical fiber, the electronic system being adapted to receive the other power measurement of the other photodetector, the electronic system being configured to extract an other differential radiation induced attenuation measurement in the other radio-sensitive optical fiber with respect to the reference optical arm.

13. The dosimeter according to claim 4, wherein the light source comprises a laser diode or a superluminescent diode.

14. The dosimeter according to claim 5, wherein the light source comprises a laser diode or a superluminescent diode.

15. The dosimeter according to claim 9, wherein the light source is capable of emitting the light beam at a first wavelength and at a second wavelength distinct from the first wavelength, the first photodetector being adapted to record a power measurement of the light beam transmitted through the radio-sensitive optical fiber at the first wavelength and at the second wavelength, the second photodetector being adapted to record the reference power measurement at the first wavelength and at the second wavelength, and wherein the electronic system is capable of extracting the differential radiation induced attenuation measurement at the first wavelength and at the second wavelength.

16. The dosimeter according to claim 9, comprising at least one temperature sensor arranged to acquire at least one temperature measurement at at least one point of the dosimeter, and wherein the electronic system is adapted to correct the differential radiation induced attenuation measurement as a function of said at least one temperature measurement.

17. The dosimeter according to claim 9, comprising an other radio-sensitive optical fiber and a beam splitter arranged between the light source, the radio-sensitive optical fiber and the other radio-sensitive optical fiber, the beam splitter being capable of splitting the light beam between the radio-sensitive optical fiber and the other radio-sensitive optical fiber, an other photodetector arranged to record an other power measurement of the light beam transmitted through the other radio-sensitive optical fiber, the electronic system being adapted to receive the other power measurement of the other photodetector, the electronic system being configured to extract an other differential radiation induced attenuation measurement in the other radio-sensitive optical fiber with respect to the reference optical arm.

18. The dosimeter according to claim 10, comprising an other radio-sensitive optical fiber and a beam splitter arranged between the light source, the radio-sensitive optical fiber and the other radio-sensitive optical fiber, the beam splitter being capable of splitting the light beam between the radio-sensitive optical fiber and the other radio-sensitive optical fiber, an other photodetector arranged to record an other power measurement of the light beam transmitted through the other radio-sensitive optical fiber, the electronic system being adapted to receive the other power measurement of the other photodetector, the electronic system being configured to extract an other differential radiation induced attenuation measurement in the other radio-sensitive optical fiber with respect to the reference optical arm.

19. The dosimeter according to claim 11, comprising an other radio-sensitive optical fiber and a beam splitter arranged between the light source, the radio-sensitive optical fiber and the other radio-sensitive optical fiber, the beam splitter being capable of splitting the light beam between the radio-sensitive optical fiber and the other radio-sensitive optical fiber, an other photodetector arranged to record an other power measurement of the light beam transmitted through the other radio-sensitive optical fiber, the electronic system being adapted to receive the other power measurement of the other photodetector, the electronic system being configured to extract an other differential radiation induced attenuation measurement in the other radio-sensitive optical fiber with respect to the reference optical arm.

20. A dosimetry method comprising the following steps:
emitting a light beam,
splitting the light beam into a first part of the light beam and a second part of the light beam,
injecting the first part of the light beam into a radio-sensitive optical fiber, the radio-sensitive optical fiber having a phosphorus or aluminium-doped core, the light beam being depolarized and the radio-sensitive optical fiber being a single-mode or multi-mode optical fiber which is not of the polarization-maintaining type or, the light beam being polarized and the radio-sensitive optical fiber being a polarization-maintaining fiber;
injecting the second part of the light beam into a reference optical arm of smaller optical length than that of the radio-sensitive optical fiber,
recording on a first photodetector a power measurement of the light beam transmitted through the radio-sensitive optical fiber;
recording on a second photodetector a reference power measurement of the light beam transmitted through the reference optical arm;
electronically processing the power measurement of the first photodetector and the reference power measurement of the second photodetector to extract therefrom a differential radiation induced attenuation measurement in the radio-sensitive optical fiber with respect to the reference optical arm.

* * * * *